United States Patent [19]

Laurent

[11] Patent Number: 4,928,801
[45] Date of Patent: May 29, 1990

[54] SELF-CENTERING FREEWHEEL MECHANISM

[75] Inventor: Jean M. Laurent, Villebon sur Yvette, France

[73] Assignee: SKF France, Clamart, France

[21] Appl. No.: 207,852

[22] Filed: Jun. 17, 1988

[30] Foreign Application Priority Data

Jul. 15, 1987 [FR] France .................. 87 09955

[51] Int. Cl.⁵ .............................................. F16D 41/07
[52] U.S. Cl. ................................. 192/45.1; 192/41 A
[58] Field of Search ...................... 192/41 A, 45.1; 188/82.8

[56] References Cited

U.S. PATENT DOCUMENTS

| | | | |
|---|---|---|---|
| 2,832,450 | 4/1958 | Wade | 192/45.1 |
| 2,856,045 | 10/1958 | Ferris | 192/45.1 |
| 2,912,086 | 11/1959 | Troendly et al. | 192/45.1 |
| 3,049,205 | 8/1962 | Ferris | 192/45.1 |
| 3,104,744 | 9/1963 | Wade | 192/45 |
| 3,937,310 | 2/1976 | Oldfield | 192/45.1 |
| 4,252,221 | 2/1981 | Lanzerath et al. | 192/45.1 |
| 4,635,770 | 1/1987 | Shoji et al. | 192/45.1 |
| 4,736,827 | 4/1988 | Kinoshita | 192/45.1 |
| 4,771,873 | 9/1988 | Kinoshita et al. | 192/45.1 |

FOREIGN PATENT DOCUMENTS

| | | |
|---|---|---|
| 1203625 | 1/1960 | France . |
| 2089973 | 7/1972 | France . |
| 2136159 | 12/1972 | France . |
| 2521668 | 8/1983 | France . |

Primary Examiner—Peter R. Brown
Assistant Examiner—Brian K. Green
Attorney, Agent, or Firm—Beveridge, DeGrandi & Weilacher

[57] ABSTRACT

A self-centering freewheel mechanism comprises at least one cage containing wedging cams and U-shaped bearings with inner and outer branches facing towards the cage. Radial protuberances on the cage cooperate elastically with at least one of the surfaces of the branches of each bearing facing towards the inside of the U-shape to fasten the cage and the bearings together in the axial direction.

10 Claims, 5 Drawing Sheets

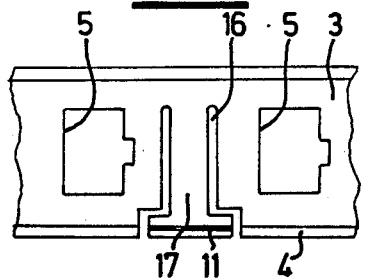
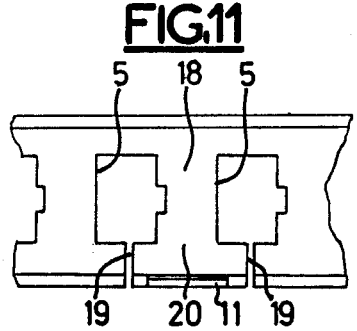
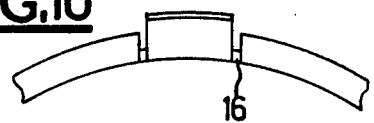
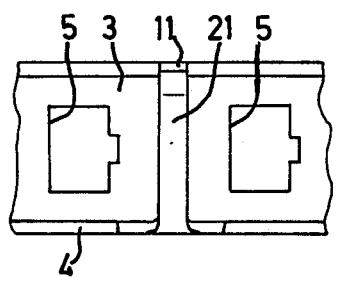
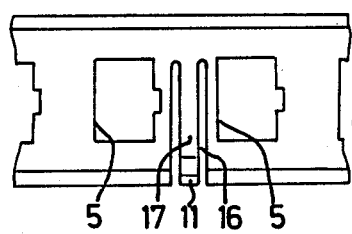
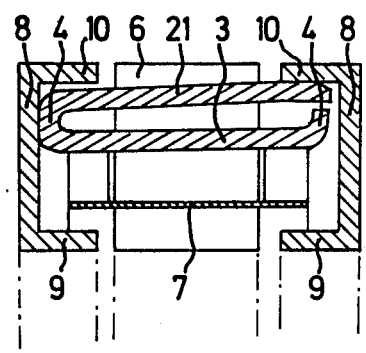
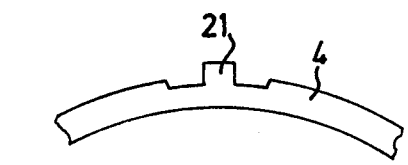
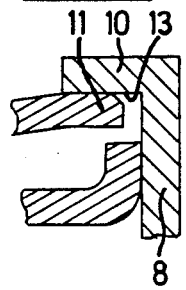
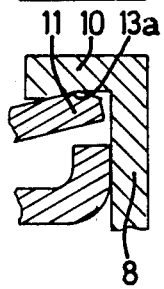
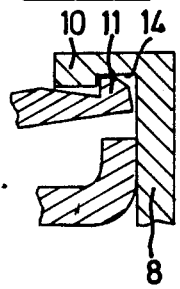
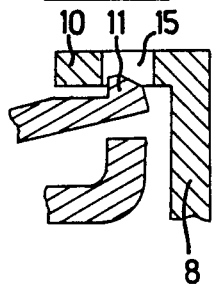

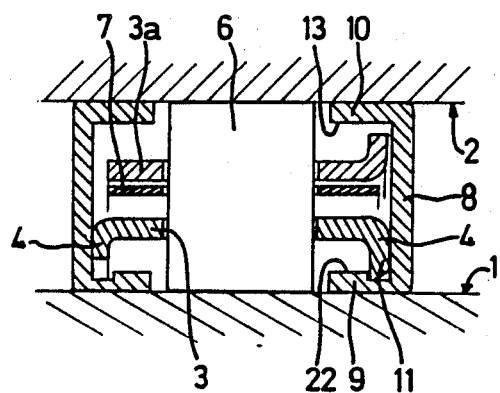

SELF-CENTERING FREEWHEEL MECHANISM

BACKGROUND OF THE INVENTION

1. Field of the Invention

The invention concerns self-centering freewheel mechanisms using cams and bearings.

2. Description of the Prior Art

This type of freewheel mechanism, as used in automatic gearboxes in particular, comprises:
the freewheel mechanism proper comprising:
   at least one set of multiple wedging cams, and
   spring means (generally a leaf spring) acting on the cams in the direction tending to wedge them to transmit torque;
lateral bearings, generally U-shaped in cross-section with a base perpendicular to the axis and two branches, an inside branch and an outside branch.

The combination comprising the freewheel mechanism and the bearings is designed to be inserted between an inside sliding path (shaft) and an outside sliding path (housing).

The function of the freewheel subsystem is unidirectional transmission of torque between the shaft and the housing.

The bearings subsystem is designed only to procure mutual centering of the shaft and housing and to transmit radial forces between the two components.

The freewheel subsystem is arranged so that the cams are normally held in the cage or cages by the spring and can only escape during manipulation of the freewheel before it is mounted on the vehicle.

On the other hand, where the lateral bearings are concerned:
either there is no fastening between the lateral bearings and the remainder of the freewheel, which makes it difficult to handle the assembly before and during mounting on the vehicle (with the risk of dropping it, and of damaging or losing the bearings),
or the fastening devices linking the bearings and the rest of the freewheel are complex and costly.

Document FR-A 2 524 093 discloses a device in which the axial fastening of the lateral bearings to the rest of the freewheel uses a "piano string" spring shaped so that it passes alternately between the cams and notches of the bearings to fasten all parts together in the axial direction. It goes without saying that assembling a device of this kind is somewhat delicate.

Document US-A 3 104 744 shows a device in which one of the bearings is fixed to the rest of the freewheel by crimping the rim of the bearing at several points onto the flank of the cage, the fit between the bore in the rim of the bearing and the outside diameter of the flank of the cage being chosen so that there is very little radial clearance between these two parts.

The main disadvantages of this device are:
the need for a final crimping operation (additional cost),
the risk of local damage to the surface of the bearing in the crimping area,
the fact that crimping of this kind is only feasible on thin bearings.

The objective of the present invention is to eliminate the previous disadvantages, that is to say to overcome the problems explained using simple devices that are easy to manufacture and secure axial fastening together of the bearings and the rest of the freewheel in such a way that it is impossible for the assembly to come apart under normal conditions of handling before and during mounting on a vehicle.

SUMMARY OF THE INVENTION

The invention consists in a self-centering freewheel mechanism comprising at least one cage, wedging cams in said at least one cage, U-shaped bearings having inner and outer branches oriented towards said at least one cage, and radial protuberances on said at least one cage adapted to cooperate elastically with at least one of the surfaces of said branches of each bearing facing towards the inside of the U-shape to fasten said at least one cage and said bearings together in the axial direction.

There are preferably six equi-angularly spaced protuberances alternating between opposite sides of said at least one cage.

These radial protuberances cooperate with the cylindrical surface of the branch by friction only, or by interlocking with this surface which features a recess, a groove near the base of the U-shape or holes stamped out of the branch.

The radial protuberances may be formed directly from the flanks of the cage and rely on the general elasticity of the cage or be carried by flexible tangs cut out from the cage and/or its flanks and rely on the local and individual elasticity of these tangs.

Other features of the invention will emerge from the following description given by way of example only of various embodiments shown in the appended drawings.

BRIEF DESCRIPTION OF THE DRAWINGS

FIGS. 9 and 10 show in plan and elevation parts of the cage with deformable tangs cut into the cylindrical wall of the cage.

FIGS. 11 and 12 show respective variations on the FIGS. 9 and 10.

FIGS. 13 through 15 respectively show in plan view, elevation and axial cross-section another embodiment with elastic tangs cut into the flanks of the cage and folded back.

FIGS. 16 through 19 are partial axial cross-sections to a larger scale showing various fastening arrangements used in the embodiments of FIGS. 9 through 15.

FIG. 20 is an alternative embodiment with inboard fastening and a double cage.

DESCRIPTION OF THE PREFERRED EMBODIMENTS

Figure 1:
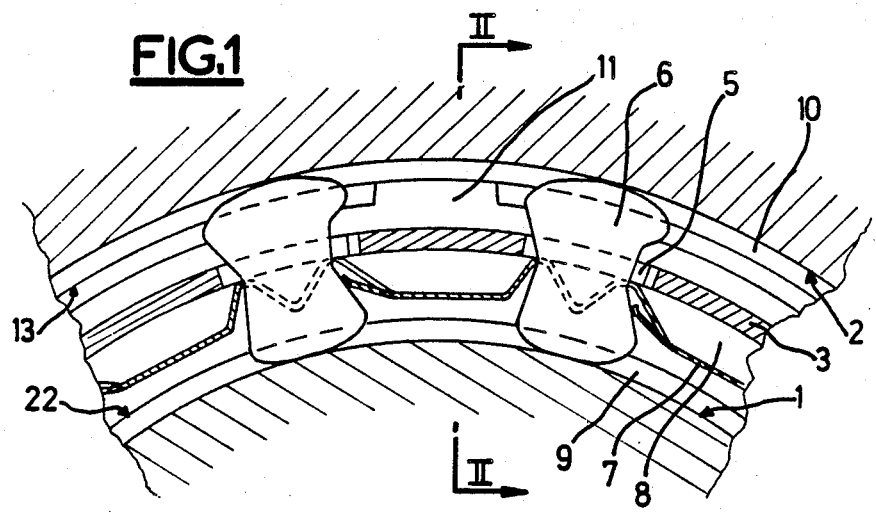
FIG. 1 is a partial view of a mechanism in accordance with the invention in cross-section on the line I—I in FIG. 2.
Figure 2:
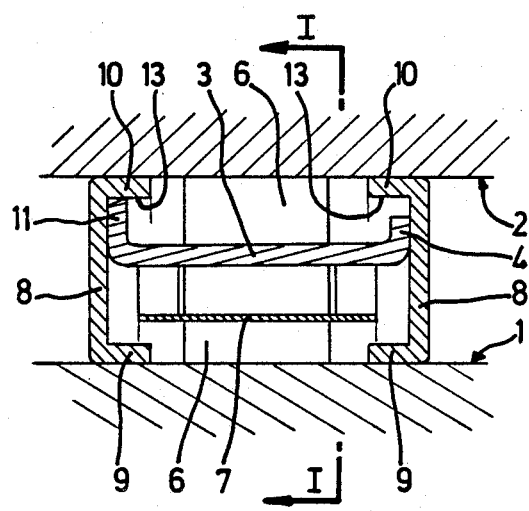
FIG. 2 is a transverse cross-section on the line II—II in FIG. 1.
Figure 3:
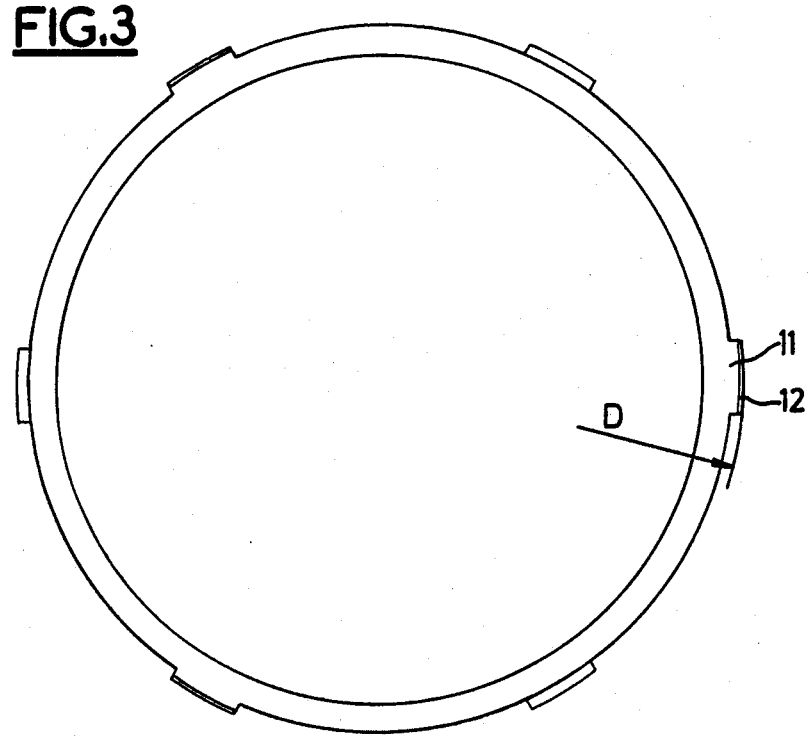
FIGS. 3 and 4 show in elevation and plan view the cage from the embodiment of FIGS. 1 and 2.
Figure 4:
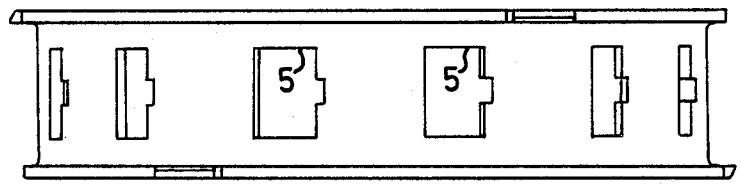
Figure 5:
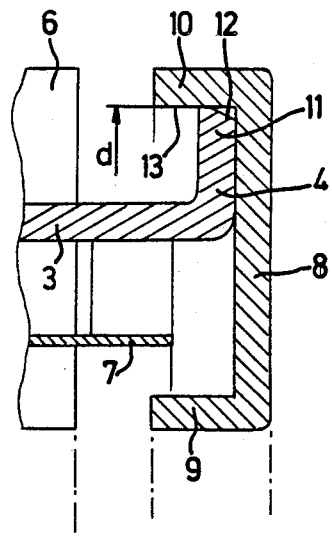
FIGS. 5 through 8 show in partial axial cross-section to a larger scale various ways for securing a bearing.

Referring to FIGS. 1 and 2, there are shown the internal sliding path 1 or shaft and the external sliding path 2 or housing between which the freewheel mechanism in accordance with the invention using lateral bearings has to be inserted.

The freewheel proper comprises a cage 3 which usually has a cylindrical wall and inwardly directed lateral flanks 4. The cylindrical wall of the cage 3 comprises openings 5 into each of which is inserted a cam 6 retained by a continuous leaf spring 7 disposed inside the cage.

The lateral bearings 8 are U-shaped in cross-section with an inner branch 9 and an outer branch 10 oriented towards the cage 3.

Each of the branches 9 and 10 has a cylindrical surface on the outside of the U-shaped cross-section and which bears on the corresponding surface 1 or 2 to implement the function of the bearing. This refers of course to the innermost cylindrical wall of the inner branch 9 and the outermost cylindrical wall of the outer branch 10. These branches further comprise another surface oriented towards the inside of the U-shaped cross-section, that is to say the outermost surface of the inner branch 9 and the innermost surface of the outer branch 10, these latter surfaces normally not being used. The principal idea of the invention is precisely the use of one of these surfaces to fasten the bearings 8 to the cage 3 in the axial direction.

A particularly simple first embodiment shown in FIGS. 1 though 5 entails providing each of the flanks 4 of the cage 3 with a number of radial protuberances 11. In this preferred embodiment there are three of them on each flank 4, alternating between one flank and the other so as to occupy six equi-angularly distributed positions. Each of these protuberances is provided with a bevel 12 on the outside to facilitate its insertion into the corresponding bearing 8. Finally, the diameter D defined by the tops of the various radial protuberances 11 is naturally slightly greater than the diameter d of the innermost surface 13 of the outer branch 10 of each bearing 8.

It is therefore sufficient to press each of the bearings 8 towards the cage to insert the various protuberances 11 into the surface 13, by virtue of the bevels 12 and general elastic deformation of the cage. Fastening is in this case achieved merely by friction between the radial protuberances 11 and the surfaces 13.

Figure 6:
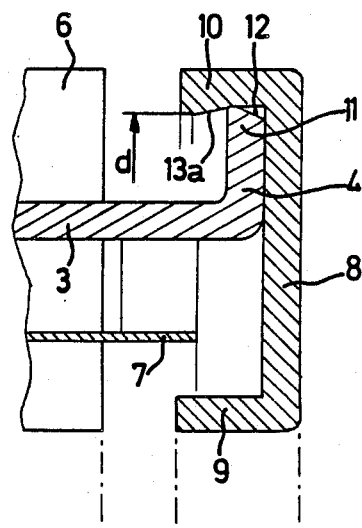

As an alternative to this, as shown in FIG. 6, the fastening can be enhanced by replacing the cylindrical surface 13 with a surface 13a which is shaped to feature recesses while the outermost surface of the branch 10 naturally remains cylindrical to fulfil its bearing function.

Figure 7:
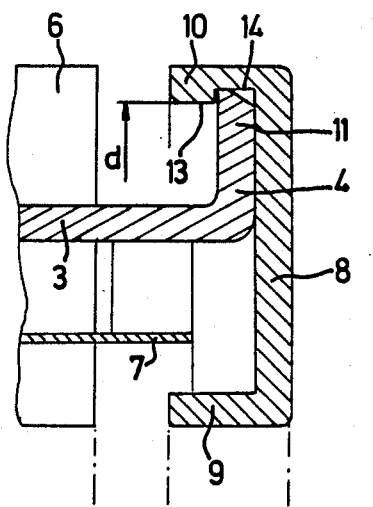
Figure 8:
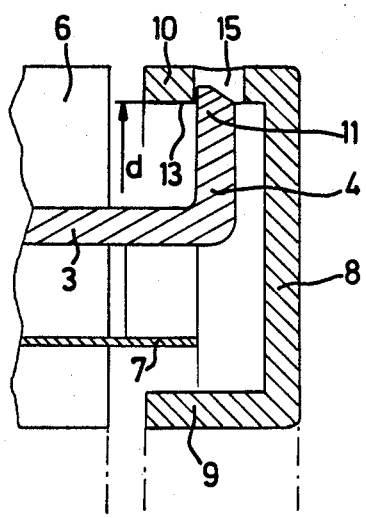

In the embodiment shown in FIG. 7, the fastening can be further enhanced by machining a groove 14 into the surface 13 near the base of the bearing 8. In this case each of the bearings is snap-fastened onto the cage at assembly time. Finally, to avoid the need to machine the groove 14, the alternative arrangement shown in FIG. 8 may be used whereby holes 15 are punched through the branch 10 into which the radial protuberances 11 are inserted. In this case it is naturally necessary to index each bearing 8 relative to the cage at assembly time.

Instead of relying on the general elasticity of the cage, as in the preceding examples, it is possible as shown in FIGS. 9 and 10 to provide in the cage 3 cutouts 16 in both the cylindrical part of the cage and one of the flanks 4 so as to delimit tangs 17 each of which ends with a protuberance 11. Assembly is as previously except that in this case it relies on the local elasticity of each individual tang 17.

The tangs 17 may be cut between two consecutive openings 5, as in the example of FIGS. 9 and 10, or the whole of an area 18 situated between two openings 5 may be used as the tang, in this case by making two cuts 19 opening into two consecutive openings 5 on either side of the radial protuberance 11 so as to free the end 20 of the part carrying the protuberance 11 so that it can move elastically.

The embodiment shown in FIG. 12 corresponds to that of FIG. 9 but with the T-shaped tang replaced by a straight shape with a narrower radial protuberance 11.

Instead of the material of the elastic tang carrying the protuberances being obtained from the cylindrical part of the cage, as in the examples of FIGS. 9 through 12, it can also be obtained directly from the flank 4 of the cage opposite the radial protuberance 11, the tang 21 obtained in this way being then folded across the cage between two consecutive openings 5 to fulfil its retaining function on the appropriate side, as shown in FIG. 15.

In the embodiments of FIGS. 9 through 15, as in the previous embodiments, fastening may be secured by friction only as in FIG. 16, or by means of recesses as shown in FIG. 17, or by snap-fastener engagement in a groove as shown in FIG. 18, or by snap-fastener engagement in holes as shown in FIG. 19.

Rather than the radial protuberances 11 of the cage projecting outwardly and cooperating with the innermost surface 13 of the outer branch 10, as in all the previous examples, fastening could also be obtained using the facing surface 22, meaning the outermost surface of the inner branch 9, as shown in FIG. 20, especially if the cage 3 comprises branches 4 projecting radially inwards.

All the foregoing would naturally apply equally well to cages 3 comprising a single flank 4 or no flanks at all, or to known type freewheels comprising two concentric cages 3 and 3a as shown in FIG. 20.

I claim:

1. Self-centering freewheel mechanism comprising at least one cage, wedging cams in said at least one cage, U-shaped bearings having inner and outer branches oriented towards said at least one cage, and fastening means for fastening said cage to both of said bearings to prohibit movement of said bearings in an axial direction, said fastening means including a plurality of circumferentially spaced radial protuberances on said at least one cage, said radial protuberances bearing elastically against at least one of said branches of each bearing facing towards the inside of the U-shape to fasten said at least one cage and said bearings together in the axial direction.

2. Mechanism according to claim 1, wherein there are six equi-angularly spaced protuberances alternating between opposite sides of said at least one cage.

3. Mechanism according to claim 1, wherein said branches have cylindrical surfaces, and said protuberances are adapted to fasten the corresponding bearing to said at least one cage by friction against the cylindrical surfaces of said branches.

4. Mechanism according to claim 1, wherein said at least one surface of said branches facing towards the inside of the U-shape with which said protuberances are adapted to cooperate comprises recesses and said bearings are fastened to said at least one cage by cooperation between said protuberances and said recesses.

5. Mechanism according to claim 1, wherein said at least one surface of said branches facing towards the inside of the U-shape with which said protuberances are adapted to cooperate comprises a groove near the base of said U-shape and said bearings are fastened to said at least one cage by snap-fastener fashion cooperation between said protuberances and said groove.

6. Mechanism according to claim 1, wherein said branches of said U-shaped bearings comprise stamped out holes and said bearings are fastened to said at least one cage by snap-fastener cooperation between said protuberances and said holes.

7. Mechanism according to claim 1, wherein said at least one cage is inherently elastic and said protuberances are parts of flanks of said at least one cage and their elastic cooperation with said at least one surface of said branches facing towards the inside of the U-shape relies on said inherent elasticity of said at least one cage.

8. Mechanism according to claim 1, comprising flexible tangs cut out from a cylindrical part of said at least one cage and said protuberances are at the ends of said tangs and their elastic cooperation with said at least one surface of said branches facing towards the inside of the U-shape relies on the elasticity of said tangs.

9. Mechanism according to claim 1, wherein said protuberances have bevelled ends to facilitate centering and assembling said bearings on said at least one cage.

10. Mechanism according to claim 1, comprising flexible tangs cut out from a flank of said at least one cage and said protuberances are at the ends of said tangs and their elastic cooperation with said at least one surface of said branches facing towards the inside of the U-shape relies on the elasticity of said tangs.

* * * * *